(12) United States Patent
McClary et al.

(10) Patent No.: US 9,649,599 B2
(45) Date of Patent: May 16, 2017

(54) SURFACE-MODIFIED FLUOROPOLYMER MEMBRANE

(71) Applicant: W. L. Gore & Associates, Inc., Newark, DE (US)

(72) Inventors: Bradley Marshall McClary, Elkton, MD (US); Tarun Poddar, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 15/169,057

(22) Filed: May 31, 2016

(65) Prior Publication Data

US 2016/0271568 A1  Sep. 22, 2016

Related U.S. Application Data

(63) Continuation of application No. 13/624,012, filed on Sep. 21, 2012, now Pat. No. 9,427,709.

(Continued)

(51) Int. Cl.
*B01D 39/00* (2006.01)
*B01D 39/14* (2006.01)
(Continued)

(52) U.S. Cl.
CPC ............ *B01D 69/02* (2013.01); *B01D 61/18* (2013.01); *B01D 67/0086* (2013.01); *B01D 69/10* (2013.01); *B01D 71/32* (2013.01); *B01D 71/36* (2013.01); *B29C 49/08* (2013.01); *D02J 1/06* (2013.01); *D02J 1/22* (2013.01); *B01D 2323/00* (2013.01); *B01D 2323/42* (2013.01); *B01D 2325/02* (2013.01); *B01D 2325/04* (2013.01); *B01D 2325/42* (2013.01); (Continued)

(58) Field of Classification Search
CPC ..... C08L 27/18; C08F 222/06; H01M 10/052; C08K 5/3445; B01D 69/12; B01D 71/03; B29C 43/006; B29C 43/22; B29C 43/24; B29C 43/48; B29C 55/00
See application file for complete search history.

(56) References Cited

U.S. PATENT DOCUMENTS 3,718,059 A  2/1973  Clayton
3,953,566 A  4/1976  Gore
(Continued)

FOREIGN PATENT DOCUMENTS

CN  1052434 A  6/1991
CN  1136034 A  1/2004
(Continued)

*Primary Examiner* — Ana Fortuna
(74) *Attorney, Agent, or Firm* — Kilpatrick Townsend & Stockton, LLP

(57) ABSTRACT

A method for use in the manufacture of a filtration article includes providing a porous, fluoropolymer membrane, and applying a force to at least a portion of a first side surface of the membrane to modify the first side surface. The applied force may have a non-normal directional component relative to the first side surface. The surface modification may increase the density of the modified surface and/or reduce the porosity of the modified surface. Particle retention capabilities are thereby enhanced across the modified surface while maintaining permeability across the volume of the membrane.

11 Claims, 7 Drawing Sheets

Related U.S. Application Data

(60) Provisional application No. 61/538,625, filed on Sep. 23, 2011.

(51) Int. Cl.

| | | |
|---|---|---|
| *B01D 71/26* | (2006.01) | |
| *B01D 69/02* | (2006.01) | |
| *D02J 1/22* | (2006.01) | |
| *D02J 1/06* | (2006.01) | |
| *B29C 49/08* | (2006.01) | |
| *B01D 67/00* | (2006.01) | |
| *B01D 71/32* | (2006.01) | |
| *B01D 61/18* | (2006.01) | |
| *B01D 69/10* | (2006.01) | |
| *B01D 71/36* | (2006.01) | |
| *B29C 59/04* | (2006.01) | |
| *B29K 27/18* | (2006.01) | |
| *B29K 105/04* | (2006.01) | |
| *B29L 31/00* | (2006.01) | |

(52) U.S. Cl.
CPC .......... *B29C 59/04* (2013.01); *B29K 2027/18* (2013.01); *B29K 2105/04* (2013.01); *B29L 2031/755* (2013.01)

(56) References Cited

U.S. PATENT DOCUMENTS

| | | | |
|---|---|---|---|
| 4,277,429 A | 7/1981 | Okita | |
| 4,385,093 A | 5/1983 | Hubis | |
| 4,788,601 A * | 11/1988 | Kawasaki | H04N 5/94 348/533 |
| 4,815,714 A | 3/1989 | Douglas | |
| 4,863,604 A | 9/1989 | Lo et al. | |
| 4,985,296 A * | 1/1991 | Mortimer, Jr. | B29C 55/18 264/175 |
| 5,064,593 A | 11/1991 | Tamaru et al. | |
| 5,094,895 A | 3/1992 | Branca et al. | |
| 5,154,827 A | 10/1992 | Ashelin et al. | |
| 5,183,545 A | 2/1993 | Branca et al. | |
| 5,217,666 A | 6/1993 | Tamaru et al. | |
| 5,476,589 A | 12/1995 | Bacino | |
| 5,700,544 A | 12/1997 | Goodwin et al. | |
| 5,814,405 A * | 9/1998 | Branca | B01D 39/1692 264/127 |
| 5,910,277 A | 6/1999 | Ishino et al. | |
| 5,976,380 A | 11/1999 | Moya | |
| 6,030,428 A | 2/2000 | Ishino et al. | |
| 6,103,172 A * | 8/2000 | Newman | B01D 67/0027 210/500.36 |
| 6,149,702 A | 11/2000 | Kawano et al. | |
| 6,214,093 B1 | 4/2001 | Nabata et al. | |
| 6,235,377 B1 * | 5/2001 | Dillon | B01D 67/0027 428/212 |
| 6,500,532 B1 | 12/2002 | Ruefer et al. | |
| 6,946,182 B1 * | 9/2005 | Allgeuer | B29C 43/222 264/134 |
| 7,306,729 B2 | 12/2007 | Bacino et al. | |
| 7,374,679 B2 | 5/2008 | Huang et al. | |
| 7,416,761 B2 | 8/2008 | Wang et al. | |
| 8,708,161 B2 * | 4/2014 | Ariji | B01D 67/0009 210/500.21 |
| 2003/0213744 A1 | 11/2003 | Kools et al. | |
| 2007/0187319 A1 | 8/2007 | Kools et al. | |
| 2009/0061205 A1 | 3/2009 | Hokazono et al. | |
| 2009/0191399 A1 * | 7/2009 | Moore | C09D 129/04 428/319.3 |
| 2010/0051535 A1 | 3/2010 | Hokazono | |
| 2010/0242733 A1 | 9/2010 | Shimatani | |
| 2010/0248324 A1 | 9/2010 | Xu et al. | |
| 2010/0280200 A1 | 11/2010 | Poddar et al. | |
| 2011/0039960 A1 | 2/2011 | Xu et al. | |
| 2013/0075325 A1 * | 3/2013 | McClary | B01D 67/0086 210/500.27 |

FOREIGN PATENT DOCUMENTS

| | | |
|---|---|---|
| EP | 0433787 A1 | 6/1991 |
| EP | 2163297 A1 | 3/2010 |
| EP | 2209156 A1 | 7/2010 |
| GB | 1270777 A | 4/1972 |
| JP | H03-179038 | 8/1991 |
| JP | 2000-061280 A | 2/2000 |
| JP | 2006-110400 A | 4/2006 |
| JP | 2009-039716 A | 2/2009 |
| JP | 2010-058024 A | 3/2010 |

* cited by examiner

SURFACE-MODIFIED FLUOROPOLYMER MEMBRANE

The present application is a continuation application of pending U.S. application Ser. No. 13/624,012, filed Sep. 21, 2012, which claims priority to U.S. Provisional Application No. 61/538,625, filed Sep. 23, 2011, now U.S. Pat. No. 9,427,907, the entire contents and disclosure of which is incorporated by reference.

FIELD OF THE INVENTION

The invention relates to an improved fluoropolymer membrane for liquid filtration applications, and to a method of modifying a surface of a fluoropolymer membrane to create a "smeared" surface with superior particle retention and sufficient liquid permeability for use in liquid filtration applications.

BACKGROUND OF THE INVENTION

Porous membranes are widely used in the filtration of particulate, ionic, microbial and other contaminants from fluids in pharmaceutical, microelectronics, chemical and food industries. In use, the membranes are formed into a device (e.g., pleated cartridge elements, hollow tubes, stack of flat disks, etc.) which is placed in the fluid stream to be filtered.

The trend towards narrower line widths in semiconductor manufacturing has placed an ever increasing burden on particulate contamination control in semiconductor fabrication. The trend to tighter filtration has led to the introduction of fluoropolymer filtration membranes, with a rated pore size as low as 10 nm. Despite the success of such membranes, there is a need for fluoropolymer membranes to maintain sufficient liquid permeability while realizing superior particle retention.

Known methods to improve the particle retention or decrease the pore rating of a fluoropolymer membrane include compressing the membrane by passing the membrane through the nip of two calendar rolls. While such compression causes densification of the membrane, thereby improving particle retention, the compressed membrane suffers a significant loss in liquid permeability thereby limiting its use as a filtration device.

SUMMARY OF THE INVENTION

The present invention provides a fluoropolymer membrane having enhanced particle retention and acceptable liquid permeability, thereby yielding the membrane particularly apt for liquid filtration applications. Relatedly, the invention provides a method of improving the particle retention of a fluoropolymer membrane while maintaining acceptable liquid permeability.

In one aspect, a method may comprise modifying a surface of a porous, fluoropolymer membrane, e.g., to create a "smeared" surface. In this regard, the fluoropolymer membrane may have a microstructure characterized by nodes interconnected by fibrils. The smeared surface may have a higher specular gloss value (e.g., absence of discernable nodes/fibrils) compared to a specular gloss value of such surface prior to surface modification.

In one characterization, a method is provided for use in the manufacture of a filtration article that includes the steps of providing a porous, fluoropolymer membrane, and applying a force to at least a portion of a first side surface of the fluoropolymer membrane to yield the desired surface modification. The applied force may have a non-normal directional component relative to the first side surface. In some embodiments at least one of the first side surface and a source of the applied force may be moved relative to the other. The application of force may be realized by a number of approaches, including mechanical means.

In some implementations, a mechanical modification force may be applied by contacting at least a portion of a first side surface of a membrane with a contact surface of a surface modification device so as to mechanically modify the first side surface. In this regard, contacting may include moving at least one of the contact surface and the first side surface relative to the other one of the contact surface and first side surface, thereby yielding a "frictionally-modified surface".

In one approach, the contact surface may be advanced in a first direction. Additionally and/or alternatively, the fluoropolymer membrane may be moved so as to advance the first side surface thereof in a second direction, wherein the first and second directions may be different. For example, the first and second directions may be opposite directions.

In another approach, the contact surface may be advanced in a first direction at a first speed. The fluoropolymer membrane may be advanced so as to also advance the first side surface thereof in the first direction at a second speed, wherein the first and second speeds are different.

In one embodiment, the contact surface of the surface modification device may be advanced along an arcuate path. For example, the contact surface may be provided on a rotatable cylindrical surface of the surface modification device (e.g., an outward-facing surface) to present a curved contact surface (e.g. an annular surface) for rotative engagement with the first side surface of the fluoropolymer membrane.

In one approach the membrane may be advanced along a linear path relative to a rotating annular contact surface. In another approach, the membrane may be advanced along an arcuate path relative to a rotatable annular contact surface.

To facilitate processing, the fluoropolymer membrane may be provided in an elongated web form, wherein the web may be advanced past a rotatable surface modification device so that the contact surface engages a limited portion of a surface of the web across a width thereof. In turn, the web surface is progressively modified along the length thereof.

In one approach, a rotatable roller drive may be driven in a first direction to advance a fluoropolymer membrane web along an arcuate path, and a rotatable surface modification device may be driven in a second direction to advance a contact surface (e.g. an annular surface) along an arcuate path, wherein at least a portion of a first side surface of the fluoropolymer membrane is frictionally modified by the contact surface of the surface modification device as it engages and moves relative to the rotating surface modification device. In another approach, a rotatable roller drive may be driven in a first direction to advance a fluoropolymer membrane web along an arcuate path at a first speed, and a rotatable surface modification device may be driven in the first direction to advance a contact surface (e.g. an annular surface) along an arcuate path at a second speed, different than the first speed, wherein a first side surface of the fluoropolymer membrane is frictionally modified by the contact surface of the surface modification device as it engages and moves relative to the rotating surface modification device.

In another characterization, a method may be provided in which a porous fluoropolymer membrane is provided, and a force, having a non-normal directional component, is applied to a first side surface of the membrane so as to increase a density and/or to decrease a porosity of the first side surface. The application of force may be provided as noted above.

By way of example, surface density may be increased across a thickness of the first side surface that is less than a nominal thickness of the fluoropolymer membrane. Additionally and/or alternatively, surface porosity may be decreased across a thickness of the first side surface that is less than a nominal thickness of the fluoropolymer membrane.

In certain implementations, a method may further include applying a force, having a non-normal directional component, to a second side surface of the fluoropolymer membrane to reduce a porosity and/or to increase a density of the second side surface. The application of force may be provided as noted above. In such implementations, the second side surface may be opposite to the first side surface of the fluoropolymer membrane.

In conjunction with method embodiments, a fluoropolymer membrane may be provided having a microstructure of nodes interconnected by fibrils. For example, an expanded PTFE membrane (e.g. of single-piece construction) may be utilized. In another embodiment, a membrane comprising an expanded copolymer of TFE and PSVE may be provided. In such embodiments, the method may further include displacing laterally a portion of the nodes and fibrils in response to the force application step.

In a further aspect, an improved filtration article may be provided comprising a porous, fluoropolymer membrane with enhanced particle retention and acceptable liquid permeability. Such benefits may be realized by providing a force-modified surface on the membrane, e.g. a frictionally-modified surface.

In this regard, the improved membrane may have at least a first portion and a second portion. The first portion may include a first side surface that has been at least partially, or entirely, frictionally-modified. The first portion may have a first average density (e.g., across the volume thereof) that is greater than a second average density of the second portion (e.g., across the volume thereof) and/or the first portion may have a first average porosity (e.g., across the volume thereof) that is less than a second average porosity across the second portion (e.g., across the volume thereof).

In some embodiments, the volume of the first portion that includes the first side surface may be less than the volume of the second portion. In various embodiments, the second portion may include a second side surface. In such applications, the first side surface and the second side surface of the membrane may be located on opposing sides thereof.

In various embodiments, the filtration article may comprise a porous, expanded polytetrafluoroethylene membrane (e.g. of single-piece construction) having porosity and/or density features as noted above. In such embodiments, the membrane may be coated with an ionomer, e.g., a perfluoro ion exchange polymer. In other embodiments, a filtration article may include a membrane comprising an expanded copolymer of TFE and PSVE.

In another characterization, a filtration article may comprise a porous, fluoropolymer membrane having a first side surface and a second side surface of differing specular gloss. For example, a membrane may be provided having a frictionally-modified, first side surface displaying a specular gloss that is higher than a specular gloss of the second side surface. In this regard, the first side surface may be frictionally-modified, while the second side surface is not frictionally modified or is frictionally-modified to lesser extent than the first side surface.

In additional implementations, the membrane of the filtration article may include a third portion having a second side surface, opposite to said frictionally-modified first side surface of the membrane. In such embodiments, the second portion of the membrane may be located between the first portion and the third portion. In one example, the membrane may be provided such that the third portion has a third average density that is the same or greater than a second average density of the second portion and/or a third average porosity that is the same or less than a second average porosity at the second portion.

In yet a further aspect, a filtration article may be provided that comprises a porous, fluoropolymer membrane that provides 28 nm particle retention greater than 30 percent.

The various filtration articles contemplated by the present invention may be manufactured utilizing various aspects of the methodology described above. Further, numerous additional modalities, features, and advantages of the present invention may become apparent to those skilled in the art upon consideration of the embodiment descriptions provided hereinbelow.

DETAILED DESCRIPTION OF THE ILLUSTRATED EMBODIMENTS

Figure 1:
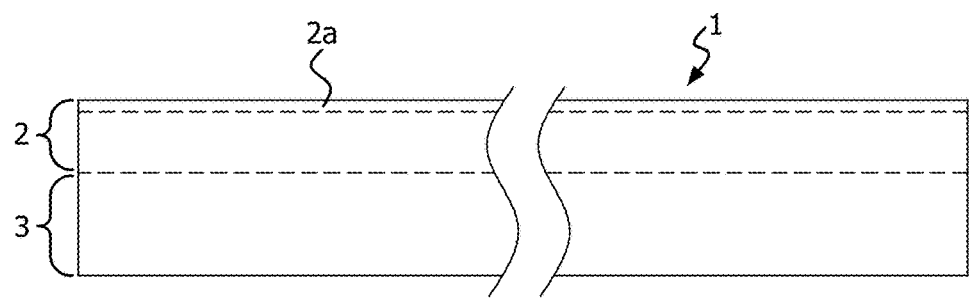
FIG. 1 illustrates a side view of one embodiment of a porous, fluoropolymer membrane.

Described herein are fluoropolymer articles having a modified, or "smeared," surface, and methods for manufacture of such fluoropolymer articles. The inventive articles have superior particle retention with sufficient liquid permeability to be useful as a filtration device.

The fluoropolymer articles may comprise an, expanded PTFE membrane having force-modified surface, e.g. frictionally-modified. Optionally, the expanded PTFE may be of a single piece construction. The expanded PTFE membrane may be prepared according to the methods described in U.S. Pat. No. 7,306,729, U.S. Pat. No. 3,953,566, U.S. Pat. No. 5,476,589 and U.S. Pat. No. 5,183,545, hereby incorporated by reference in their entirety.

A filtration article comprising a surface-modified, expanded PTFE membrane may comprise a single layer or constructed as a composite having multiple layers. The multiple layers may all be identical or may vary in terms of porosity, pore size, and microstructure.

In some filtration article embodiments, a surface-modified fluoropolymer membrane may be laminated to a polymeric support layer using known methods in the art. The support layer may comprise wovens, non-wovens, knits, nets, etc.

In one embodiment, a fluoropolymer article may comprise a surface-modified, expanded PTFE membrane having at least a portion of a surface coated with a perfluoro ion exchange polymer. The coated membrane may be prepared according to the methods described in U.S. Pat. No. 5,183,545 and U.S. Pat. No. 5,094,895, hereby incorporated by reference in their entirety. See, e.g., Example 1 hereinbelow.

In another embodiment, a fluoropolymer article may comprise an expanded polymeric material comprising a functional TFE copolymer material comprising a microstructure characterized by nodes interconnected by fibrils, wherein the functional TFE copolymer material comprises a functional copolymer of TFE and PSVE. The functional TFE copolymer material may be prepared according to the methods described in US Patent Publication Nos: US 2010/0248324 and US 2011/0039960, hereby incorporated by reference in their entirety. See, e.g., Example 3 hereinbelow.

In another embodiment, a fluoropolymer article may comprise a water permeable porous material comprising a functional TFE copolymer material comprising a microstructure characterized by nodes interconnected by fibrils, wherein the functional TFE copolymer material comprises a functional copolymer of TFE, PSVE and sulfonic acid pendant to the polymer chain. These materials may be prepared according to the methods described in US2010/0280200, hereby incorporated by reference in its entirety. See, e.g., Example 4 hereinbelow.

In various embodiments, a fluoropolymer article may take the form of stacked disks of flat porous polymeric membrane, pleated cartridge or tubular form, depending on end use.

As indicated above, the particle retention of the fluoropolymer article may be significantly enhanced by applying a force having a non-normal directional component to provide at least one force-modified surface on the fluoropolymer membrane. In contemplated embodiments, surface modification may be realized by mechanical processing means to provide a frictionally-modified surface, as will be further described hereinbelow.

Reference is now made to FIG. 1 which illustrates a surface-modified, fluoropolymer membrane embodiment. The porous fluoropolymer membrane 1 may include a first portion 2 and a second portion 3. The first portion 2 may include a modified first surface 2a. Such surface modification may yield a first portion 2 having an average density across the volume thereof that is greater than an average density across the volume of the second portion 3. Additionally and/or alternatively, such surface modification may yield a first portion 2 having an average porosity across the volume thereof that is less than an average porosity across the volume of the second portion 3.

Figure 2:
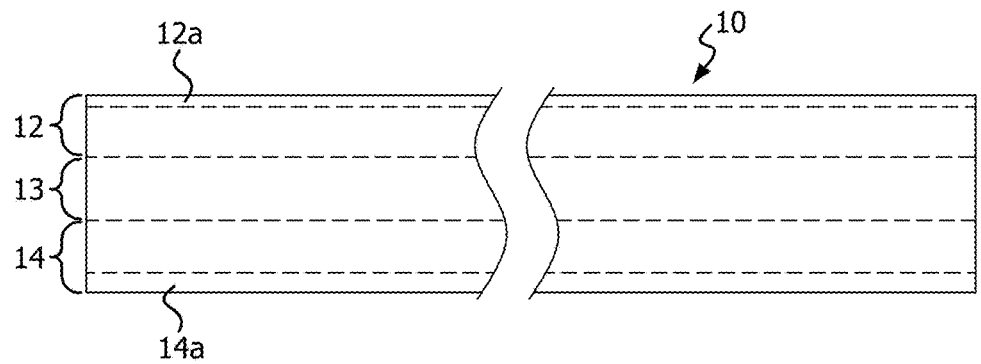
FIG. 2 illustrates a side view of another embodiment of a porous, fluoropolymer membrane.

FIG. 2 illustrates another embodiment of a surface-modified, fluoropolymer membrane. The porous membrane 10 may include a first portion 12, a second portion 13, and a third portion 14. The first portion 12 may include a modified first surface 12a. Such surface modification may yield a first portion 12 having an average density across the volume thereof that is greater than an average density across the volume of the second portion 13. Additionally and/or alternatively, such surface modification may yield a first portion 12 having an average porosity across the volume thereof that is less than an average porosity across the volume of the second portion 13.

Optionally, the third portion 14 may include a modified second surface 14a that has been force-modified, e.g. frictionally-modified. The modified second surface 14a may yield a third portion 14 having an average density across the volume thereof that is greater than the average density across the volume of the second portion 13. Additionally and/or alternatively, such surface modification may yield a third portion having an average porosity across the volume thereof that is less than the average porosity across the volume of the second portion 13.

In arrangements where a modified first surface 12a and a modified second surface 14a are provided, the relative porosities and densities across the side surfaces 12a and 14a may be the same or different. In this regard, surface modification of such surfaces may be controlled to establish the desired relative measures.

Figure 3:
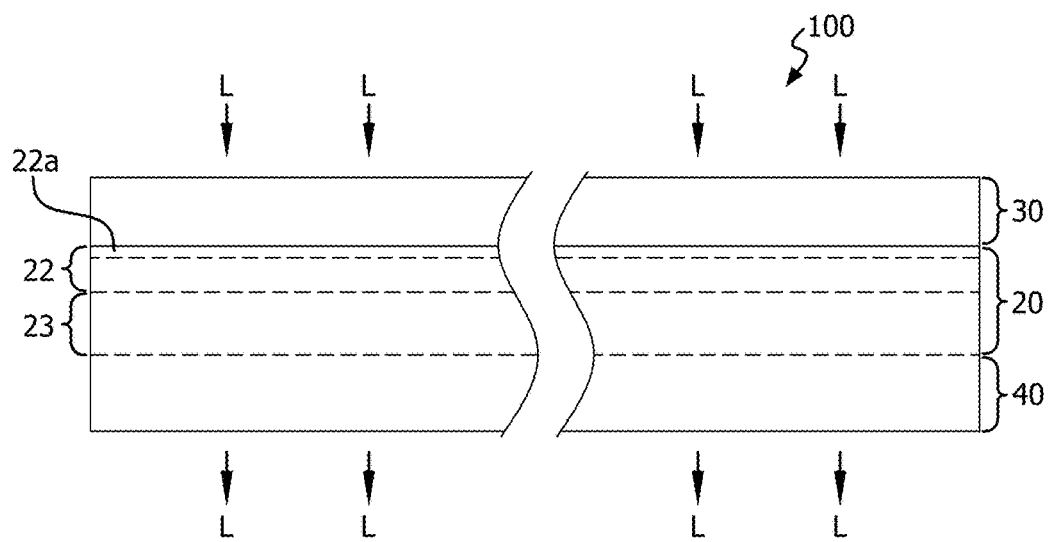
FIG. 3 illustrates a side view of an embodiment of a filtration article comprising the membrane embodiment of FIG. 1.

In FIG. 3, one embodiment of a filtration article comprising a surface-modified fluoropolymer membrane is shown. The filtration article 100 includes a porous fluoropolymer membrane 20 disposed adjacent to at least a first support layer 30. As shown, the porous fluoropolymer membrane 20 may be disposed between a first support layer 30 and a second support layer 40. In this regard, the first support layer 30 and/or second support layer 40 may comprise one or more of the following: wovens, non-wovens, knits, and nets.

As shown in FIG. 3, the porous fluoropolymer membrane 20 may comprise a first portion 22 and second portion 23. The first portion 22 may include a modified first surface 22a. The modified first surface 22a may be disposed on an upstream side of the filtration article 100, wherein liquid L is filtered at modified first surface 22a prior to passage through the balance of the porous fluoropolymer membrane 20. Alternatively, first surface 22a may be disposed on a downstream side of the filtration article 100. As may be appreciated, enhanced particle retention is provided by modified first surface 22a.

The modified first surface 22a yields a first portion 22 having an average density across the volume thereof that is greater than an average density across the volume of the second portion 23. Additionally and/or alternatively, such surface modification may yield a first portion 22 having an average porosity across the volume thereof that is less than an average porosity across the volume of the second portion 23.

Figure 4:
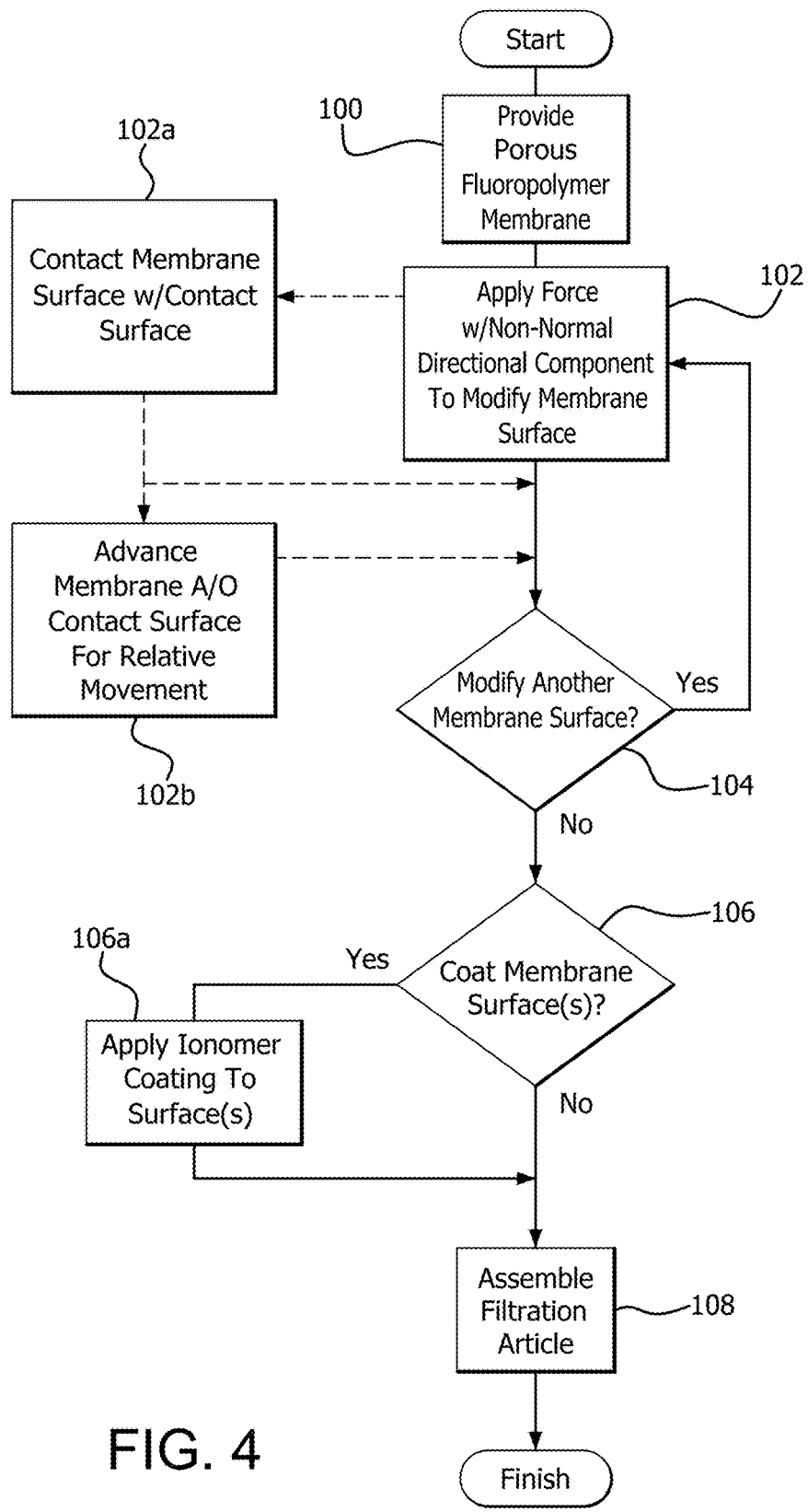
FIG. 4 is a process flow diagram of a method embodiment for manufacture of a surface-modified, porous, fluoropolymer membrane and filtration article comprising such a membrane.

FIG. 4 illustrates one embodiment of a method of manufacturing a filtration article having improved particle retention and acceptable liquid permeability. The method may include the provision of a porous, fluoropolymer membrane (step 100). In various embodiments, the porous, fluoropolymer membrane may comprise an expanded PTFE as referenced hereinabove, an expanded polymeric material comprising a functional TFE copolymer material that includes a functional copolymer of TFE and PSVE as referenced hereinabove, a functional TFE copolymer material that comprises a functional copolymer of TFE, PSVE, and sulphonic acid appended to the polymer chain as referenced hereinabove, or other fluoropolymer membranes.

The method further includes modifying a surface of the fluoropolymer membrane by applying a force thereto, wherein the applied force has a non-normal directional component relative to the surface (step 102). By way of example, the application of force may be realized by contacting a membrane surface with a contact surface of a surface modification device so as to mechanically modify the membrane surface (step 102*a*). In conjunction with the application of force, relative movement between the membrane surface and contact surface may be provided to yield a frictionally-modified surface. In various embodiments, such contact may be realized by advancing one of the membrane and contact surface relative to the other, by advancing the membrane and contact surface in opposite directions, or by advancing the membrane and contact surface in the same direction at different speeds (step 102*b*). In this regard, the porous, fluoropolymer membrane may be provided as a web, wherein a surface of the web is progressively modified along the length thereof as the web is advanced past the contact surface.

The method may optionally provide for the modification of another surface of the porous, fluoropolymer membrane (step 104). In such arrangements, a modification force may be applied as described above (step 102).

Following surface modification, the method may optionally provide for coating of one or more of the surfaces of the fluoropolymer membrane (step 106). For example, in one approach an ionomer coating may be applied to a modified surface of the fluoropolymer membrane (step 106*a*). In another approach, an ionomer coating may be applied to one or more surfaces of the membrane prior to surface modification thereof.

Figure 5:
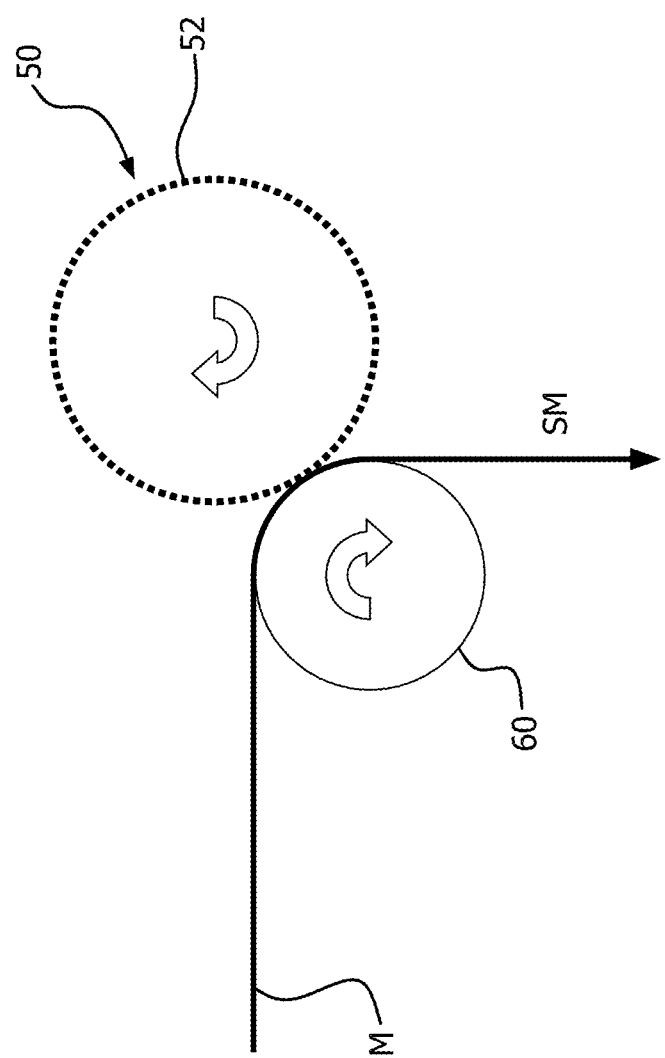
FIG. 5 shows a schematic of a process embodiment employable to modify a surface of a fluoropolymer membrane.

As further shown in FIG. 5, the method may further include assembly of a filtration article (step 108). By way of example, the membrane may be positioned between support layers, and pleated to form a cartridge device.

Reference is now made to FIG. 5 which illustrates one mechanical processing means for membrane surface-modification. As illustrated, mechanical processing means may include contacting a membrane web M with a surface modification device, e.g., by passing the membrane between two rotating rollers, one rotating in the opposite direction of the other, to yield a surface modified web SM. A first roller 60 may comprise a metal backing roll for advancing the membrane web M. A second counter-rotating roller 50 may include a buffing roller, comprising a suitable contact surface 52, for applying a force to frictionally modify a top surface of the membrane web M.

The contact surface 52 may comprise a relatively soft, or compliant, material. Non-limiting examples of contact surface materials include sateen fabric, lambs wool, PTFE film or felt and cotton muslin or flannel. Preferably, a cotton Domet flannel may be used as contact surface 52.

The surface of membrane web M to be modified is in lineal contact with the contact surface 52 across a width of the web. Preferably, there is only light physical pressure between the surface to be modified and the contact surface 52. In one embodiment, the footprint of physical contact is approximately 1 to 2 inches in the direction of rotation, and equal to the web width.

The contact surface 52 and membrane M may be provided so that the force applied by contact surface 52 has a primary directional component that is non-normal (e.g., not perpendicular) to the membrane surface. For example, the applied force may have a primary directional component that is applied at an acute angle to the membrane surface. In this regard, it may be desirable to minimize any application of a normal force, thereby maintaining light physical pressure between the contact surface 52 and the top surface of membrane web M.

As may be appreciated, the FIG. 5 mechanical means of surface modification of a fluoropolymer membrane may be utilized to enhance particle retention without altering the entire membrane structure, thereby retaining sufficient liquid permeability. That is, modification of the membrane may be largely limited to a surface portion thereof, thereby maintaining liquid permeability across the remaining volume thereof.

Utilizing a mechanical means as described in relation to FIG. 5, the exposed pores on a membrane surface may be masked by "smearing" the surface layer of nodes 200 and 202 fibrils into a film like structure, as described in the SEM micrographs in FIGS. 6*a*, 7*a*, 8*a*, 9*a*. The resulting fluoropolymer membrane has at least one frictionally-modified surface which is markedly different than that of the original membrane. The topography of such a surface may be characterized by specular gloss value.

The degree of smearing may be varied by varying the extent of work applied to the membrane surface. This may be expressed as the ratio between the linear velocities of the contact surface, e.g., buffing wheel) and the membrane web. A ratio of 50-1500 may be used. Preferably, a ratio of 200-500 may be used.

As noted above, the fluoropolymer membrane may also be modified on both surfaces with similar or varying degrees of smearing on both the surfaces.

Test Methods

Water Flow Rate

A dry membrane was draped across the tester (Sterifil Holder 47 mm Catalog Number: XX11J4750, Millipore). The test holder was filled with de-ionized water (room temperature). A 10" Hg [4.9 psid] vacuum was applied across the membrane; the time for 400 cm$^3$ of de-ionized water to flow through the membrane was measured. The water flow rate of the membrane was normalized to pressure units and was reported in units of gpm/m$^2$/psi. In the case of hydrophobic membranes, these were pre-wet with a solvent such as IPA to facilitate water passage through the pores.

Gurley

The Gurley air flow test measures the time in seconds for 100 cm$^3$ of air to flow through a 6.45 cm$^2$ sample at 12.4 cm of water pressure. The samples were measured in a Gurley Densometer Model 4340 Automatic Densometer.

Specular Gloss

Specular Gloss of a surface was determined using the procedure outlined in ASTM D2457, using a BYK Gardner Glossmeter. The value at 60 degrees was reported.

Particle Retention

The particle retention efficiency of a membrane was determined using this method. A sample (142 mm diameter) of membrane was subjected to a challenge solution containing fluorescent polystyrene latex microspheres.

Two separate challenge solutions were prepared for 28 nm microspheres (Part No G25, Thermo Fisher Scientific Inc.) and 49 nm microspheres (Part No B50, Thermo Fisher Scientific Inc.). The 49 nm challenge solution was prepared such that it contained approximately 32,000 particles per ml in a solution containing 0.1% Triton® X-100. The 28 nm challenge solution was prepared such that it contained approximately 104,000 particles per ml in a solution containing 0.1% Triton® X-100. These solutions were labeled as "challenge."

First, the membrane was wet out with IPA. Then, 500 mL of surfactant 0.1% Triton® X-100 solution was allowed to flow under a differential pressure of 6 psi across the membrane. This effluent was collected and labeled as "background."

Then, under a differential pressure of 6 psi across the membrane, 250 mL of challenge solution was allowed to flow through the membrane. The filtrate was collected and labeled as "downstream."

A Cary Eclipse fluorescent spectrophotometer was used to measure the fluorescence intensity of challenge solution, background and the downstream sample. The intensity measurements from the spectrophotometer were calibrated against a 3 point curve with calibration standards generated from a challenge solution of three different particle concentrations of a given microsphere size.

From the intensity values, the particle retention efficiency (E) in % was calculated according to the following equation:

$$E = 100\% * \left[1 - \left(\frac{\text{downstream} - \text{background}}{\text{challenge} - \text{background}}\right)\right]$$

Efficiency numbers less than about 20% were considered to be within noise levels for the method and reported as n/d or non-detect.

EXAMPLE 1

Figure 6B:
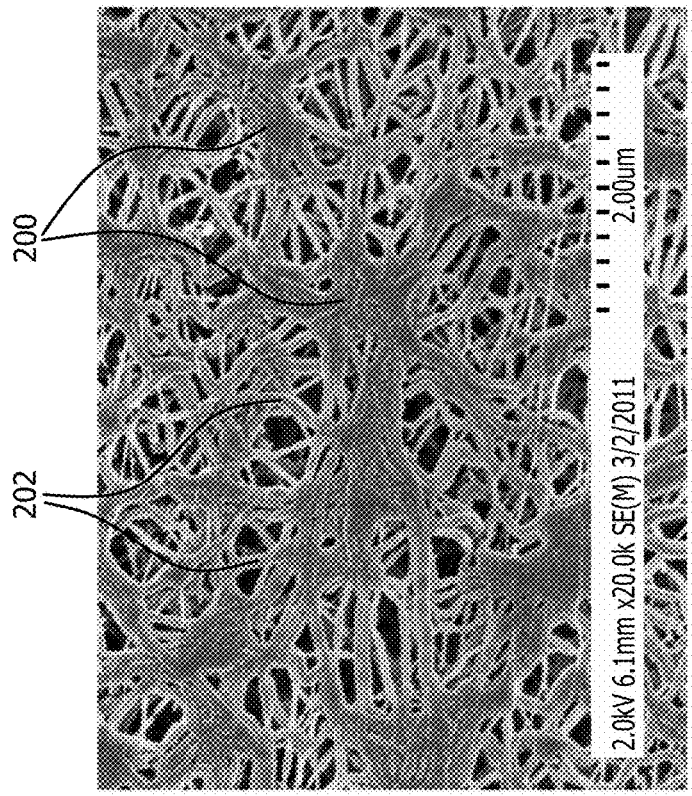
FIGS. 6a and 6b illustrate SEM micrographs of a membrane embodiment showing a modified, or smeared surface, in contrast with the original membrane surface respectively.

An expanded PTFE membrane (available under Part Number S30595 or SMPL-GMM405 from W.L. Gore & Associates, Inc.), having a nominal mass of 12 g/m² and nominal thickness of 19 micron and rated pore size of 0.05 um, was dip coated with a solution containing 1 wt % Nafion® 950 ionomer in ethanol. The membrane was then dried at about 50 degrees Celsius. The water flow rate, Gurley number, particle retention and gloss characteristics of the coated membrane are shown in Table I. An SEM micrograph of the membrane is depicted in FIG. 6b.

Figure 6A:
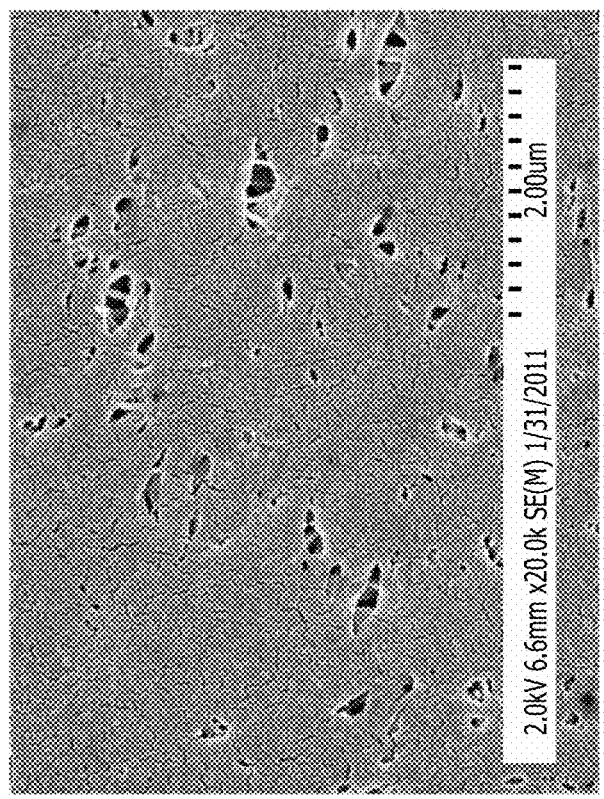

One surface of this coated membrane of about 250 square cm was modified by "buffing" with a buffing wheel mounted onto an electric drill. The buffing wheel was of the soft spiral sewn cotton muslin type, Vermont American part number 17544, or equivalent. As illustrated in Table I, the surface modified membrane had superior retention without significant loss in water flow rate compared to the unmodified coated membrane. FIG. 6a clearly shows the smeared surface resulting from the above surface modification. The specular gloss value of the smeared surface shows a marked difference compared to the unmodified coated membrane surface.

TABLE I

| | Prior to surface modification | Post surface modification |
|---|---|---|
| Gurley [sec] | 42 | 65 |
| Water Flow Rate [gpm/m²/psi] | 0.61 | 0.23 |
| 28 nm Retention [%] | n/d | 78 |
| 49 nm Retention [%] | 43 | 96 |
| Specular Gloss [Value at 60 degrees] | 4 | 20 (of the smeared surface) |

EXAMPLE 2

Figure 7B:
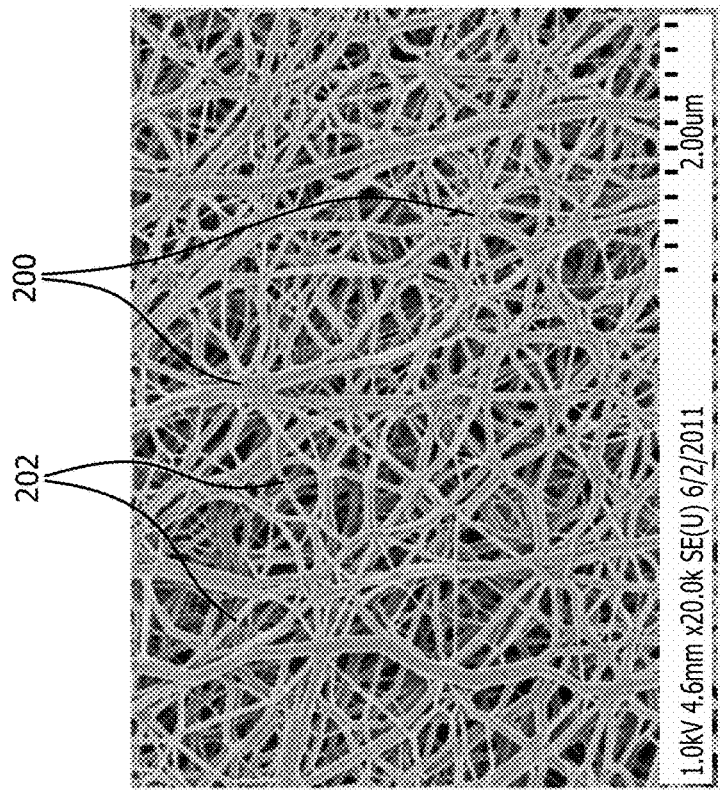
FIGS. 7a and 7b illustrate SEM micrographs of another membrane embodiment showing a modified, or smeared, surface in contrast with the original membrane surface respectively.

An expanded PTFE membrane made according to the teachings of U.S. Pat. No. 7,306,729. The water flow rate, Gurley number, particle retention and gloss characteristics of the coated membrane are shown in Table II. An SEM micrograph of the membrane is depicted in FIG. 7b.

One surface of this coated membrane of about 250 square cm was modified by "buffing" with a buffing wheel mounted onto an electric drill. the buffing wheel was of the soft spiral sewn cotton muslin type, Vermont American part number 17544 or equivalent.

Figure 7A:
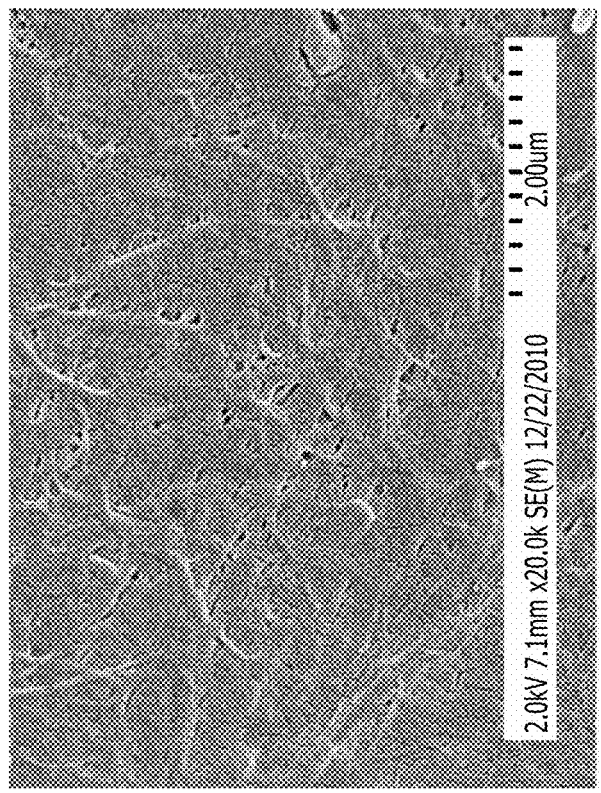

As illustrated in Table II, the surface modified membrane had superior retention without significant loss in water flow rate compared to the unmodified membrane. FIG. 7a clearly shows the smeared surface resulting from the above surface modification. The specular gloss value of the modified membrane shows a marked difference compared to the unmodified membrane.

TABLE II

| | Prior to surface modification | Post surface modification |
|---|---|---|
| Gurley [sec] | 12 | 64 |
| Water Flow Rate [gpm/m²/psi] | 1.43 | 0.55 |
| 49 nm Retention [%] | 15 (n/d) | 70 |
| Specular Gloss [Value at 60 degrees] | 2.4 | 11.9 (of the smeared surface) |

EXAMPLE 3

Figure 8B:
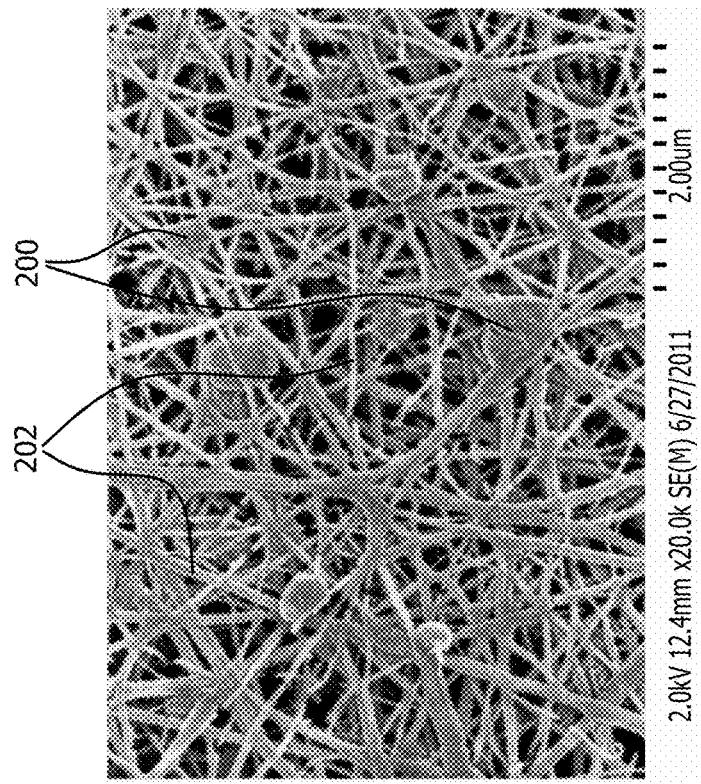
FIGS. 8a and 8b illustrate SEM micrographs of another membrane embodiment showing a modified, or smeared, surface in contrast with the original membrane surface respectively.

An expanded functional copolymer membrane comprising a copolymer of TFE and PSVE was made according to the teachings of US Patent Publication No: US2011/0039960. The water flow rate, Gurley number, particle retention and gloss characteristics of the coated membrane are shown in Table III. An SEM micrograph of the membrane is depicted in FIG. 8b.

One surface of a roll of this membrane was modified by using the equipment in the schematic illustrated in FIG. 5. FIG. 5 shows a chrome steel backing roll (60) capable of being heated and a buffing wheel (50) rotating in a direction counter to that of the direction of rotation of the backing roll. The buffing wheel was constructed of cotton muslin cloth material, Stewart MacDonald type 2084 or equivalent. The equipment also comprises an unwind and a rewind with proximity to the backing roll (60). The web of membrane (M) was threaded through the equipment and the contact between the membrane surface and buffing material was adjusted such that there was about 2 inches of lineal contact. A potentiometer controlled the drive torque of the buffer. When in rotation, the setting on the potentiometer was between 3.6 and 4.0. The backing roll was heated to 40 degrees Celsius.

The extent of work applied to the membrane surface may be expressed as the ratio between buffing wheel motion and web motion. This ratio is calculated from linear velocities of each. At a web speed of 5 ft per minute and buffer velocity of 1650 ft per minute, the ratio was thus determined to be 330.

Figure 8A:
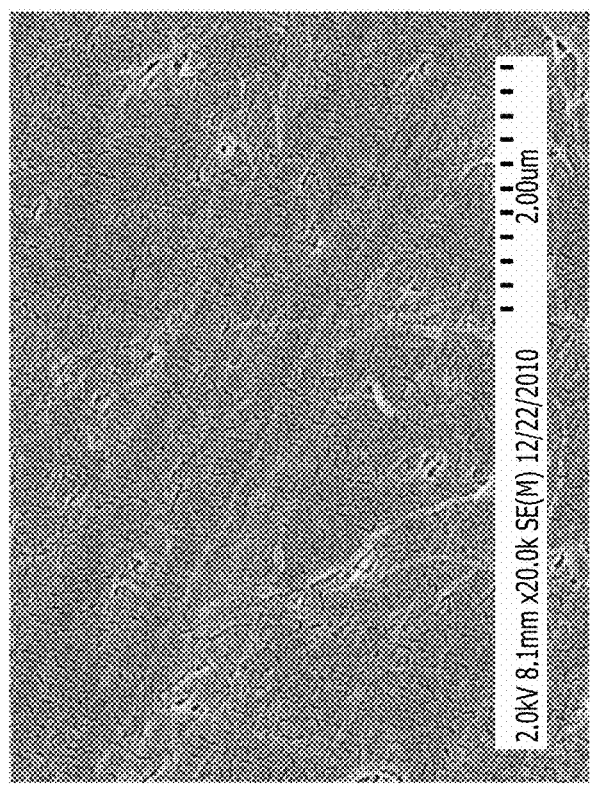

As illustrated in Table III, the surface modified membrane had superior retention without significant loss in water flow rate compared to the unmodified membrane. FIG. 8a clearly shows the smeared surface resulting from the above surface modification. The specular gloss value of the modified membrane shows a marked difference compared to the unmodified membrane.

TABLE III

| | Prior to surface modification | Post surface modification |
|---|---|---|
| Gurley [sec] | 12 | 47 |
| Water Flow Rate [gpm/m²/psi] | 3.2 | 0.34 |
| 28 nm Retention [%] | 13 (n/d) | 96 |
| 49 nm Retention [%] | (n/d) | 77 |
| Specular Gloss [Value at 60 degrees] | 4 | 37 (of the smeared surface) |

EXAMPLE 4

Figure 9B:
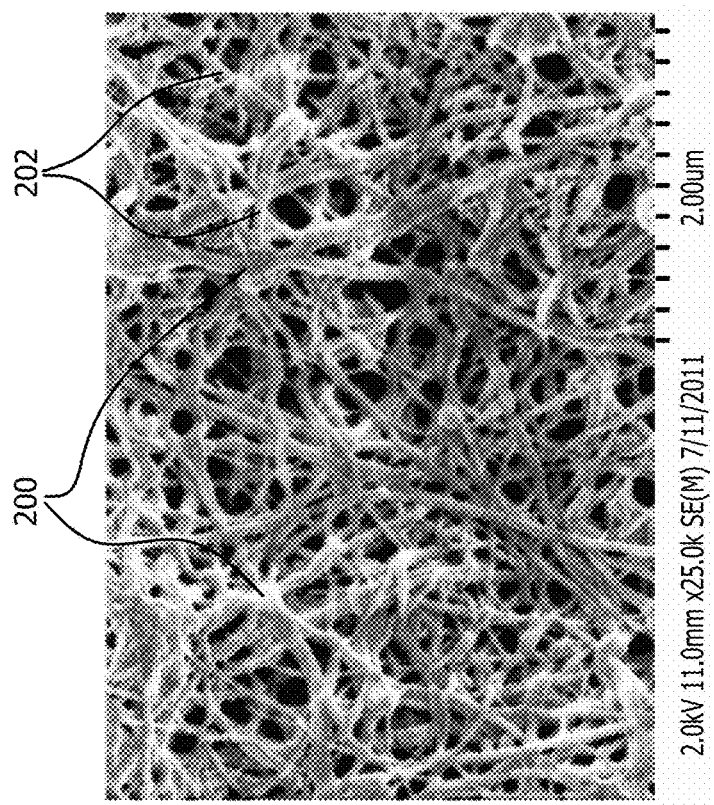
FIGS. 9a and 9b illustrate SEM micrographs of another membrane embodiment showing a modified, or smeared, surface in contrast with the original membrane surface respectively.

A water permeable expanded functional copolymer membrane comprising a copolymer of TFE and PSVE was made according to the teachings of US Patent Publication No: 2010/0280200. An SEM micrograph of the membrane is depicted in FIG. 9b. The water flow rate, Gurley number, particle retention and gloss characteristics of the water permeable membrane are shown in Table IV.

Figure 9A:
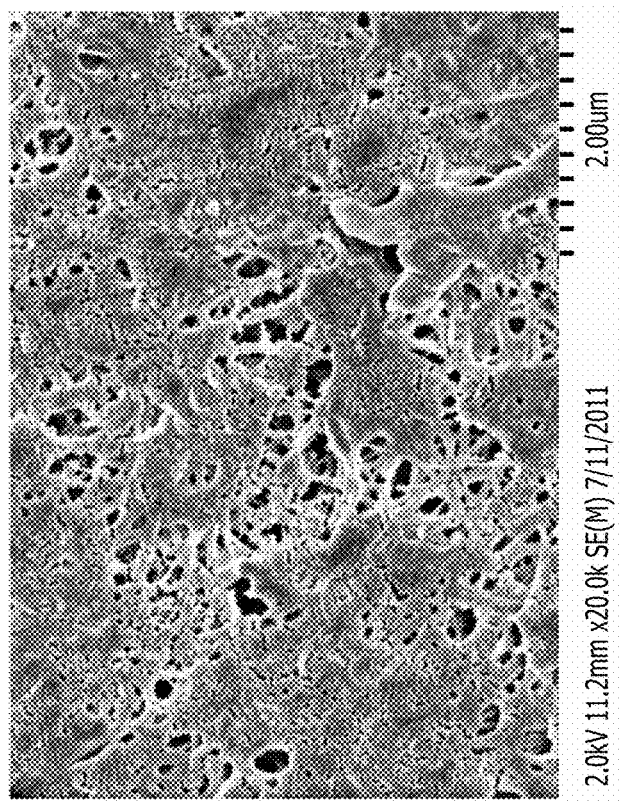

One surface of this membrane sample, about 7 inches in diameter was modified by "buffing" with a buffing wheel. The buffing wheel was of the soft spiral sewn cotton muslin type, Vermont American part number 17544, or equivalent, mounted onto an electric drill. The water flow rate, Gurley number, particle retention and gloss characteristics of the modified membrane are shown in Table IV. An SEM micrograph of the membrane is depicted in FIG. 9a.

As illustrated in Table IV, the surface modified membrane had superior retention without significant loss in water flow rate compared to the unmodified membrane. FIG. 4a clearly shows the smeared surface resulting from the above surface modification. The specular gloss value of the modified membrane shows a marked difference compared to the unmodified membrane.

TABLE IV

| | Prior to surface modification | Post surface modification |
|---|---|---|
| Gurley [sec] | 77 | 94 |
| Water Flow Rate [gpm/m²/psi] | 1.5 | 0.4 |
| 49 nm Retention [%] | 20 | 38 |
| Specular Gloss [Value at 60 degrees] | 3.5 | 7.8 (of the smeared surface) |

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A filtration article, comprising:
    a porous fluoropolymer membrane, said membrane comprising a first portion and a second portion, said first portion including a frictionally-modified surface, wherein the second portion is adjacent to a surface of the first portion that is opposite of the frictionally-modified surface, and wherein said first portion has at least one of:
    a first average density that is greater than a second average density of said second portion; and,
    a first average porosity that is less than a second average porosity of said second portion of said membrane.

2. A filtration article as recited in claim 1, wherein a total volume of the first portion is less than a total volume of the second portion.

3. A filtration article as recited in claim 1, said second portion including a second side surface, wherein said frictionally-modified surface and said second side surface of said membrane are located on opposing said sides of membrane.

4. A filtration article as recited in claim 3, wherein said frictionally-modified surface of said membrane has a specular gloss higher than a specular gloss of the second side surface.

5. A filtration article as recited in claim 1, wherein said membrane includes a third portion, and wherein said second portion is located between said first portion and said third portion.

6. A filtration article as recited in claim 5, wherein said third portion has a third average density that is greater than said second average density.

7. A filtration article as recited in claim 1, said membrane having a microstructure characterized by nodes interconnected by fibrils, wherein a portion of said first surface comprises laterally displaced ones of said node and said fibrils.

8. A filtration article as recited in claim 1, wherein said membrane provides 28 nm particle retention greater than 30 percent.

9. A filtration article as recited in claim 1, wherein said membrane is coated with an ionomer coating.

10. A filtration article as recited in claim 1, further comprising:
    at least a first support layer disposed adjacent to one side of said membrane.

11. A filtration article as recited in claim 1, wherein said filtration article further comprises:
    a second support layer disposed on a second side of said membrane, opposite to said first side.

* * * * *